United States Patent
Yamanaka et al.

(10) Patent No.: US 11,488,354 B2
(45) Date of Patent: Nov. 1, 2022

(54) INFORMATION PROCESSING APPARATUS AND INFORMATION PROCESSING METHOD

(71) Applicant: SONY CORPORATION, Tokyo (JP)

(72) Inventors: Daiki Yamanaka, Tokyo (JP); Masashi Eshima, Chiba (JP); Akihiko Kaino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 292 days.

(21) Appl. No.: 16/490,151

(22) PCT Filed: Mar. 26, 2018

(86) PCT No.: PCT/JP2018/012015
§ 371 (c)(1),
(2) Date: Aug. 30, 2019

(87) PCT Pub. No.: WO2018/216341
PCT Pub. Date: Nov. 29, 2018

(65) Prior Publication Data
US 2021/0407189 A1 Dec. 30, 2021

(30) Foreign Application Priority Data
May 22, 2017 (JP) .............................. JP2017-100739

(51) Int. Cl.
*G06T 17/10* (2006.01)
*G06T 7/55* (2017.01)
(Continued)

(52) U.S. Cl.
CPC ............ *G06T 17/10* (2013.01); *G01B 11/245* (2013.01); *G06T 7/55* (2017.01); *G06T 17/20* (2013.01)

(58) Field of Classification Search
CPC ............ G06T 17/10; G06T 7/55; G06T 17/20
See application file for complete search history.

(56) References Cited

U.S. PATENT DOCUMENTS

| 5,504,847 A | 4/1996 | Kimura et al. |
| 2003/0063086 A1* | 4/2003 | Baumberg ............ G06T 17/205 345/420 |

(Continued)

FOREIGN PATENT DOCUMENTS

| EP | 0600709 A2 | 6/1994 |
| EP | 3086085 A1 | 10/2016 |

(Continued)

OTHER PUBLICATIONS

International Search Report and Written Opinion of PCT Application No. PCT/JP2018/012015, dated Jun. 19, 2018, 10 pages of IPRP.

*Primary Examiner* — Andrew G Yang
(74) *Attorney, Agent, or Firm* — Chip Law Group

(57) ABSTRACT

To enable both an increase in reproducibility for reproduction of a shape of an object and suppression of an increase in data amount. An information processing apparatus including: an acquisition unit that acquires first information associated with a result of estimation of a shape of an object on a real space and second information associated with a result of estimation of a geometrical feature of the object; and a correction unit that corrects the first information on the basis of the second information.

9 Claims, 13 Drawing Sheets

(51) Int. Cl.
 *G01B 11/245* (2006.01)
 *G06T 17/20* (2006.01)

(56) References Cited

U.S. PATENT DOCUMENTS

| | | | |
|---|---|---|---|
| 2012/0075432 A1* | 3/2012 | Bilbrey | H04N 13/25 |
| | | | 348/48 |
| 2015/0009214 A1* | 1/2015 | Lee | G06T 17/10 |
| | | | 345/420 |
| 2016/0104314 A1 | 4/2016 | Nakazato et al. | |
| 2016/0261844 A1* | 9/2016 | Kadambi | G01B 11/24 |
| 2016/0261852 A1 | 9/2016 | Hirasawa | |
| 2017/0206714 A1* | 7/2017 | Areas | G06T 17/10 |
| 2020/0143554 A1* | 5/2020 | Toldo | G06T 17/20 |

FOREIGN PATENT DOCUMENTS

| | | |
|---|---|---|
| JP | 06-176107 A | 6/1994 |
| JP | 2015-114307 A | 6/2015 |
| JP | 2016-075637 A | 5/2016 |
| JP | 2017-016431 A | 1/2017 |
| WO | 2015/093205 A1 | 6/2015 |
| WO | 2017/002716 A1 | 1/2017 |

\* cited by examiner

FIG. 2
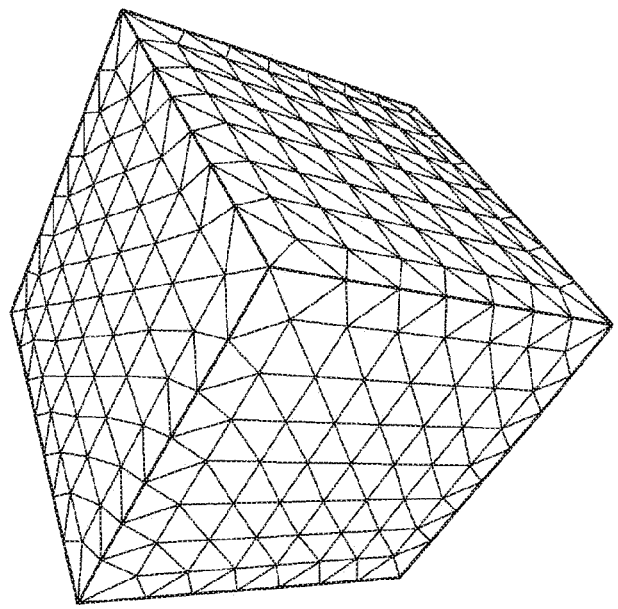
AFTER CORRECTION
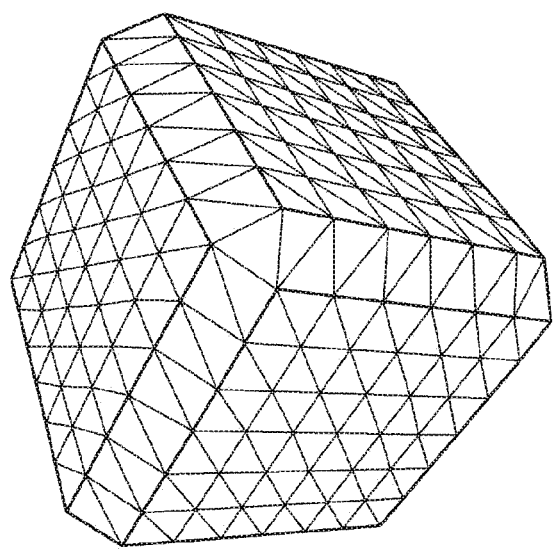
BEFORE CORRECTION

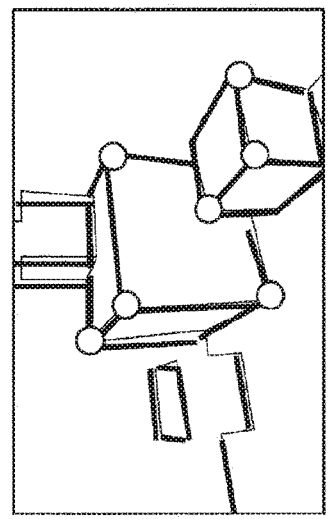
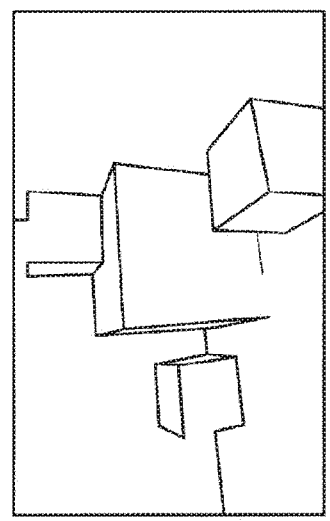
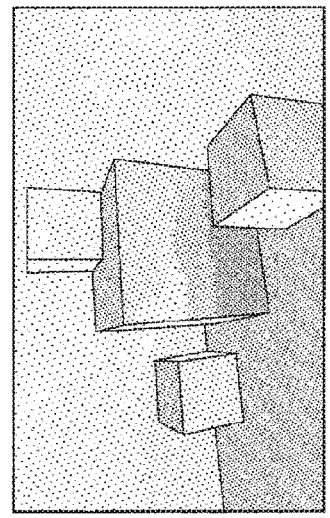
FIG. 4

FIG. 10
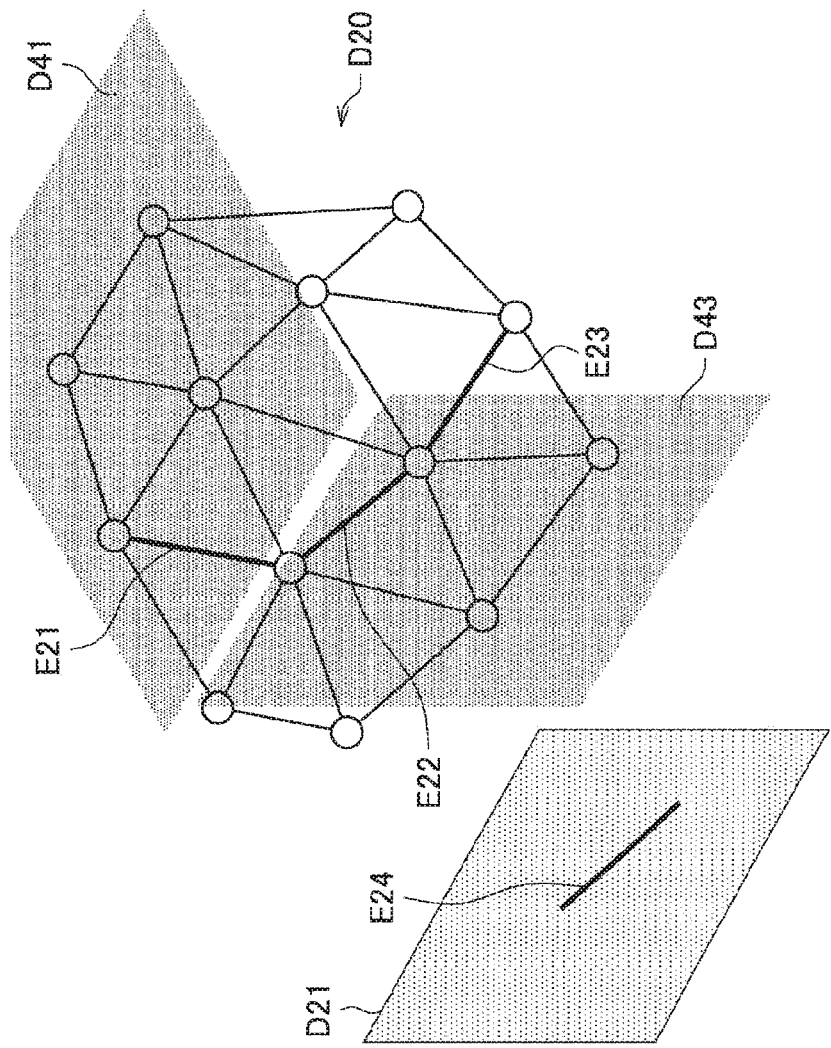
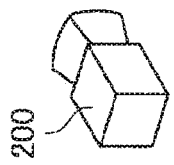

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/012015 filed on Mar. 26, 2018, which claims priority benefit of Japanese Patent Application No. JP 2017-100739 filed in the Japan Patent Office on May 22, 2017. Each of the above-referenced applications is hereby incorporated herein by reference in its entirety.

TECHNICAL FIELD

The present disclosure relates to an information processing apparatus, an information processing method, and a program.

BACKGROUND ART

In recent years, because of advancement of image recognition technology, it has become possible to three-dimensionally estimate (or measure) the position, the attitude, the shape and the like of an object on a real space (hereinafter also called the "real object") and perform reproduction (reconfiguration) as a three-dimensionally shaped model, on the basis of an image imaged by an imaging unit, e.g., a digital camera. For example, Patent Document 1 discloses an example of a technology of reproducing a three-dimensionally shaped model of an object on a real space on the basis of an image imaged by an imaging unit.

CITATION LIST

Patent Document

Patent Document 1: Japanese Patent Application Laid-Open No. 2016-75637

SUMMARY OF THE INVENTION

Problems to be Solved by the Invention

Meanwhile, estimation is difficult depending on the shape of an object. For example, regarding parts corresponding to an edge or a corner of an object, the precision of estimation of the shape tends to be reduced as compared with the precision for the other parts (e.g., a flat part), and the reproducibility of the three-dimensionally shaped model can be reduced. In such a case, for example, an increase in reproducibility can be possible when the resolution for estimation or reproduction of the shape of an object is increased, but there is a tendency that the data amount increases due to an increase in resolution.

Thus, the present disclosure proposes an information processing apparatus, an information processing method, and a program that enable both an increase in reproducibility for reproduction of the shape of an object and suppression of an increase in data amount.

Solutions to Problems

According to the present disclosure, there is provided an information processing apparatus including: an acquisition unit that acquires first information associated with a result of estimation of a shape of an object on a real space and second information associated with a result of estimation of a geometrical feature of the object; and a correction unit that corrects the first information on the basis of the second information.

Furthermore, according to the present disclosure, there is provided an information processing method including, by a computer: acquiring first information associated with a result of estimation of a shape of an object on a real space and second information associated with a result of estimation of a geometrical feature of the object; and correcting the first information on the basis of the second information.

Furthermore, according to the present disclosure, there is provided a program causing a computer to execute: acquiring first information associated with a result of estimation of a shape of an object on a real space and second information associated with a result of estimation of a geometrical feature of the object; and correcting the first information on the basis of the second information.

Effects of the Invention

As described above, the present disclosure proposes an information processing apparatus, an information processing method, and a program that enable both an increase in reproducibility for reproduction of the shape of an object and suppression of an increase in data amount.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is an explanatory view for explaining an overview of the information processing system according to the embodiment.

FIG. 4 is an explanatory view for explaining an example of data used for estimation of a shape of an object in the information processing system according to the embodiment.

FIG. 10 is an explanatory view for explaining an example of a polygon mesh correction method according to Variation 1.

MODE FOR CARRYING OUT THE INVENTION

Figure 1:
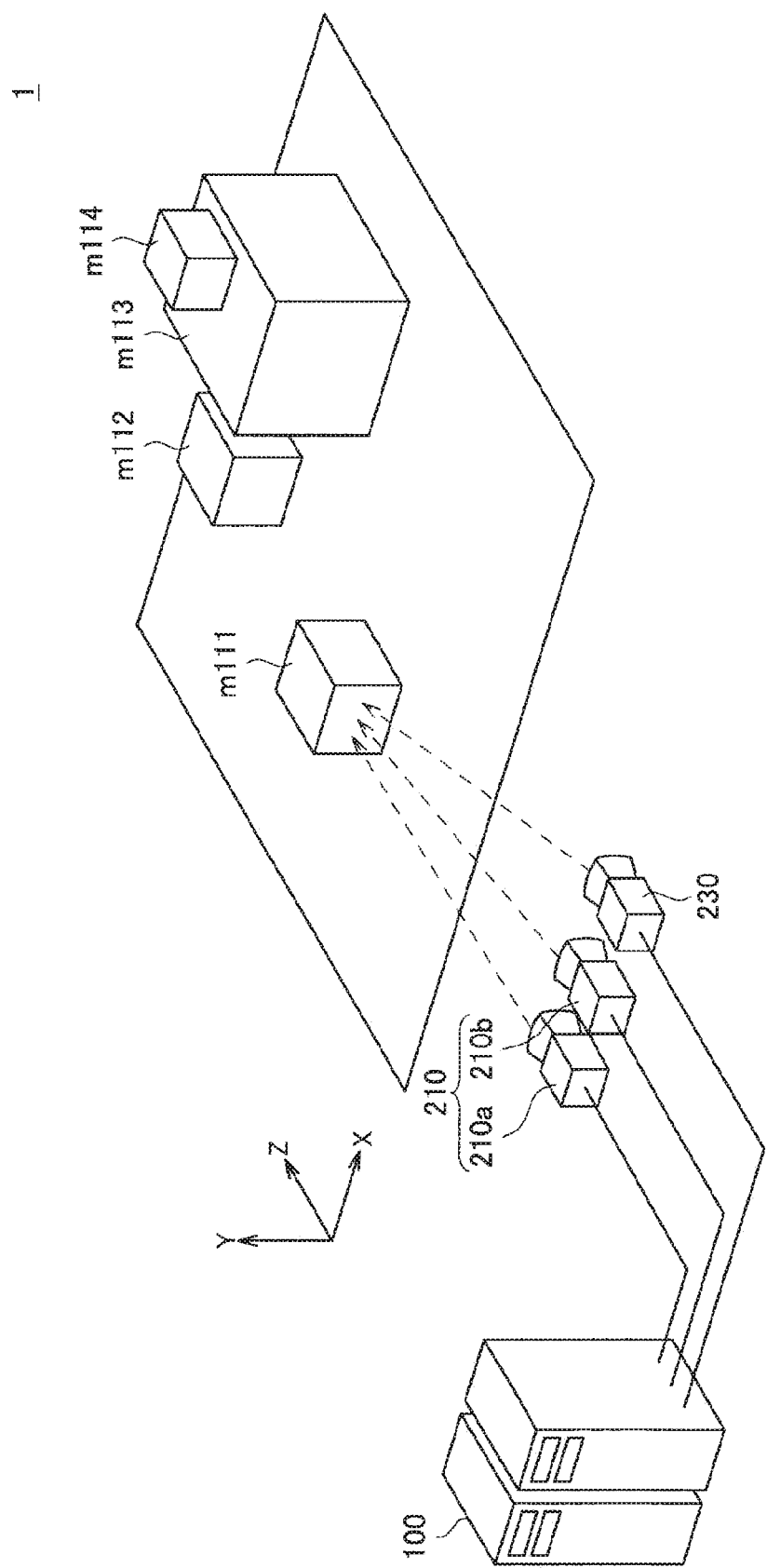
FIG. 1 is an explanatory view for explaining an example of a schematic system configuration of an information processing system according to an embodiment of the present disclosure.

Preferred embodiments of the present disclosure will be described in detail below with reference to the accompanying drawings. Note that, in this description and the drawings, configuration elements that have substantially the same function and configuration are denoted with the same reference numerals, and repeated explanation is omitted.

Note that the description is given in the order below.
1. Schematic configuration
2. Review regarding reproduction of three-dimensionally shaped model
3. Technical feature
3.1. Functional configuration
3.2. Processing
3.3. Variation
4. Hardware configuration
5. Conclusion

1. SCHEMATIC CONFIGURATION

First, with reference to FIG. 1, a description is given of an example of a schematic system configuration of an information processing system 1 according to the present embodiment. FIG. 1 is an explanatory view for explaining an example of a schematic system configuration of the information processing system 1 according to the present embodiment.

As illustrated in FIG. 1, the information processing system 1 according to the present embodiment includes a depth sensor 210, a polarization sensor 230, and an information processing apparatus 100. The depth sensor 210 and the polarization sensor 230 are connected to the information processing apparatus 100 via, for example, a predetermined network. Note that the type of network for connecting the depth sensor 210 and the polarization sensor 230 to the information processing apparatus 100 is not particularly limited. As a specific example, the network may include a so-called wireless network, e.g., a network based on standards such as LTE, Wi-Fi (registered trademark), or the like. Furthermore, the network may include the Internet, an exclusive line, a local area network (LAN), wide area network (WAN), or the like. Furthermore, the network may include a plurality of networks, and at least part may be configured as a wired network.

Furthermore, in FIG. 1, reference characters m111 to m114 schematically denote objects (real objects) positioned on a real space.

The depth sensor 210 acquires information for estimating a distance between a predetermined viewpoint and an object positioned on a real space, and transmits the acquired information to the information processing apparatus 100. Note that, in a subsequent description, the information, which is acquired by the depth sensor 210, for estimating the distance between the predetermined viewpoint and the object positioned on the real space is also called the "depth information."

For example, in the example illustrated in FIG. 1, the depth sensor 210 is configured as a so-called stereo camera including a plurality of imaging units 210a and 210b, and images an image of an object positioned on a real space from mutually different viewpoints with the imaging units 210a and 210b. In this case, the depth sensor 210 transmits the images imaged by the imaging units 210a and 210b to the information processing apparatus 100.

When a plurality of images thus imaged from mutually different viewpoints is used, for example, on the basis of a parallax between the plurality of images, it becomes possible to estimate (calculate) a distance between a predetermined viewpoint (e.g., position of the depth sensor 210) and a subject (i.e., a real object imaged in an image). Therefore, for example, it also becomes possible to generate a so-called depth map on which results of estimation of the distance between the predetermined viewpoint and a subject are mapped on an imaged plane surface.

Note that the configuration of a part corresponding to the depth sensor 210 and the method for estimation of the distance are not particularly limited as far as it is possible to estimate the distance between the predetermined viewpoint and the object (real object) on the real space. As a specific example, the distance between the predetermined viewpoint and the real object may be measured on the basis of a method, e.g., multi-camera stereo, motion parallax, time of flight (TOF), or Structured Light. Here, TOF is a method in which the time taken until light, e.g., infrared ray, is emitted to a subject (i.e., real object) and the emitted light is reflected off the subject and returned is measured with respect to each pixel so as to obtain an image (i.e., depth map) including the distance (depth) to the subject on the basis of the results of the measurement. Furthermore, Structured Light is a method in which a pattern of light, e.g., infrared ray, is emitted to a subject and is imaged to obtain a depth map including the distance (depth) to the subject on the basis of a change in pattern obtained from results of the imaging. Furthermore, motion parallax is a method of measuring the distance to the subject on the basis of parallax also in a so-called monocular camera. Specifically, the camera is moved to image the subject from mutually different viewpoints to measure the distance to the subject on the basis of a parallax between the imaged images. Note that, at this time, recognition of the movement distance and the movement direction of the camera with various sensors enables more precise measurement of the distance to the subject. Note that the configuration of the depth sensor 210 (e.g., monocular camera, stereo camera, or the like) may be changed depending on the distance measurement method.

The polarization sensor 230 senses polarized light in a predetermined polarization direction (hereinafter also simply called the "polarization") among light beams reflected off the object positioned on the real space, and transmits information corresponding to results of sensing the polarization to the information processing apparatus 100. Note that, in the information processing system 1 according to the present embodiment, the polarization sensor 230 is configured to be capable of sensing a plurality of polarizations in mutually different polarization directions (more preferably three or more polarizations). Furthermore, in a subsequent description, the information corresponding to results of sensing the polarization by the polarization sensor 230 is also called the "polarization information."

As a specific example, the polarization sensor 230 is configured as a so-called polarization camera, and images a polarization image based on polarized light in a predetermined polarization direction. In this case, the polarization sensor 230 transmits the imaged polarization image to the information processing apparatus 100.

Furthermore, it is favorable that the polarization sensor 230 be held to be capable of imaging polarization coming from a region that at least partially overlaps (ideally, substantially matching region) with a region on the real space, which is a target for acquisition of information for estimating the distance by the depth sensor 210. Note that, in a case where both the depth sensor 210 and the polarization sensor 230 are fixed in predetermined positions, when information indicating the positions of the depth sensor 210 and the polarization sensor 230 on the real space is preliminarily acquired, it is possible to handle the positions as known information.

Furthermore, the depth sensor 210 and the polarization sensor 230 may be held on a common apparatus (e.g., wearable device). In this case, for example, when the relative positional relationship of the depth sensor 210 and the polarization sensor 230 with respect to the apparatus is preliminarily calculated, it is possible to estimate the positions and attitudes of the depth sensor 210 and the polarization sensor 230 on the basis of the position and attitude of the apparatus.

Furthermore, the apparatus on which the depth sensor 210 and the polarization sensor 230 are held may be configured to be movable. In this case, for example, when a technology called localization is applied, it is possible to estimate the position and attitude of the apparatus on the real space.

Here, a description is given of a technology called simultaneous localization and mapping (SLAM) as a more specific example of the technology for estimating the position and attitude of a predetermined apparatus on the real space. SLAM is a technology of using an image unit, e.g., a camera, various sensors, an encoder, and the like to concurrently perform localization and generation of an environment map. As a more specific example, in SLAM (particularly, Visual SLAM), a three-dimensional shape of an imaged scene (or subject) is sequentially restored on the basis of a moving image imaged by an imaging unit. Then, results of the restoration of the imaged scene are associated with results of the detection of the position and attitude of the imaging unit to generate a surrounding environment map and estimate the position and the attitude of the imaging unit in the environment. Note that, regarding the position and the attitude of the imaging unit, for example, when various sensors such as an acceleration sensor and an angular velocity sensor are provided on the apparatus on which the imaging unit is held, it is possible to perform estimation as information indicating a relative change on the basis of the results of the detection of the sensor. Of course, as far as the position and the attitude of the imaging unit can be estimated, the method is not necessarily limited only to a method based on results of detection by various sensors such as an acceleration sensor or an angular velocity sensor.

Furthermore, at least one of the depth sensor 210 and the polarization sensor 230 may be configured to be movable independently of the other. In this case, it is sufficient if the position and the attitude of the sensor itself, which is configured to be movable, on the real space is individually estimated on the basis of the technology, e.g., the aforementioned localization or the like.

The information processing apparatus 100 acquires the depth information from the depth sensor 210, estimates the distance between the predetermined viewpoint and the real object on the basis of the acquired depth information, and generates a model reproducing the three-dimensional shape of the real object on the basis of the results of the estimation. Furthermore, the information processing apparatus 100 acquires the polarization information from the polarization sensor 230, and corrects the aforementioned generated model on the basis of the acquired polarization information. Note that, the processing for the generation of the model and the processing for the correction of the model will be separately described later in detail.

Note that the aforementioned configuration is a mere example and the system configuration of the information processing system 1 according to the present embodiment is not necessarily limited to the example illustrated in FIG. 1. For example, as described above, the depth sensor 210 and the polarization sensor 230 may be integrally configured as part of the apparatus that is configured to be movable. Furthermore, the depth sensor 210 and the polarization sensor 230 may be configured to be integral with the information processing apparatus 100.

Heretofore, an example of the schematic system configuration of the information processing system 1 according to the present embodiment is described with reference to FIG. 1.

2. REVIEW REGARDING REPRODUCTION OF THREE-DIMENSIONALLY SHAPED MODEL

Next, for the sake of easy understanding of features of the information processing system according to the present embodiment, an overview of an example of the processing for reproduction of a three-dimensionally shaped model is described, and a problem of the information processing system according to the present embodiment is organized.

First, regarding an example of the processing for estimating the shape of an object (real object) positioned on the real space and generating a model that three-dimensionally reproduces the shape, an overview of an example in a case where a depth map is used is described.

First, the depth map is generated when a distance in the depth direction between real objects positioned within an angle of view of the imaging unit and the imaging unit is two-dimensionally mapped in an image plane fashion. One or more depth maps thus generated are integrated as a three-dimensional space model depending on an imaging position of the imaging unit at the time of acquisition of the information for generating the depth map. Here, the three-dimensional space model is a model that three-dimensionally reproduces the position, attitude, shape and the like of a real object present in a real space.

Examples of the method of integrating the depth maps into the three-dimensional space model include a method of expressing a three-dimensional space as an isosurface of a distance field, as represented by so-called Kinect fusion. In the method of expressing a three-dimensional space in a distance field, the space is divided into voxels or polyhedrons, and each of which has a distance to the three-dimensional model. A cluster of voxels is also called volume data. In other words, updating the value of the distance of the voxel corresponding to each pixel on the depth map results in integration of the depth maps into the voxel volume along a chronological order. Note that, from the thus integrated distance field (i.e., three-dimensional space model), on the basis of a method, e.g., marching cubes or dual contouring, a polygon mesh is extracted as a model that three-dimensionally reproduces the shape of the object (i.e., real object)

on the real space. Note that the polygon mesh is a model that produces the three-dimensional shape of an object as a cluster of vertices, sides, and surfaces.

Furthermore, as another example, the examples include a method of expressing a three-dimensional space using a point cloud of results of estimation of distance. Note that, in a case where the environment of a real space is expressed by surfaces like a polygonal mesh under the situation where a three-dimensional space is expressed as a point cloud, conversion from a point cloud to a mesh is necessary. Examples of the method of converting a point cloud to a mesh include surface reconstruction or the like.

The reproduction degree of polygonal mesh depends on the fineness of division of space, and, in order to obtain a polygon mesh having high reproduction degree, the data amount tends to be large. Furthermore, in a case where depth maps from a plurality of viewpoints are integrated, an error can occur between the shape reproduced as a polygon mesh and the actual shape of the target object due to an error or noise generated during measurement of the distance, an error in estimation of the attitude of the imaging unit, or the like. In particular, parts corresponding to an edge (i.e., a side corresponding to a boundary between two surfaces) or a corner (i.e., a point corresponding to a boundary of three or more surfaces) are largely affected by, for example, the aforementioned error or noise as compared with a flat part, and the precision of shape estimation tends to be reduced, and the reproducibility of polygon mesh (i.e., three-dimensionally shaped model) can be reduced.

For example, FIG. 2 is an explanatory view for explaining an overview of the information processing system 1 according to the present embodiment. In FIG. 2, the left-hand drawing illustrated as a pre-correction drawing is an example of a polygon mesh generated on the basis of the aforementioned method, and is an example of results of reproduction of a three-dimensional shape of an object formed as a cube. In the example illustrated in the left-hand drawing of FIG. 2, edge and corner parts are not correctly reproduced, but a model lacking the information of the parts is generated.

In view of the aforementioned situation, in the information processing system 1 according to the present embodiment, a geometrical feature of an object is estimated on the basis of the polarization information acquired by the polarization sensor 230, and the three-dimensionally shaped model (e.g., polygon mesh) generated on the basis of the results of the estimation is corrected. For example, in FIG. 2, in the right-hand drawing indicated as a pre-correction drawing, an example of a polygon mesh after correction in a case where the polygon mesh illustrated in the left-hand drawing is corrected on the basis of the technology of the present disclosure is illustrated. With the aforementioned configuration, the information processing system 1 according to the present embodiment enables both an increase in reproducibility (particularly, reproducibility of edge and corner parts) of the three-dimensionally shaped model and suppression of an increase in data amount for reproducing a three-dimensional shape. A technical feature of the information processing system 1 according to the present embodiment will be described below in more details.

3. TECHNICAL FEATURE

A technical feature of the information processing system 1 according to the present embodiment is described below.

<3.1. Functional Configuration>

Figure 3:
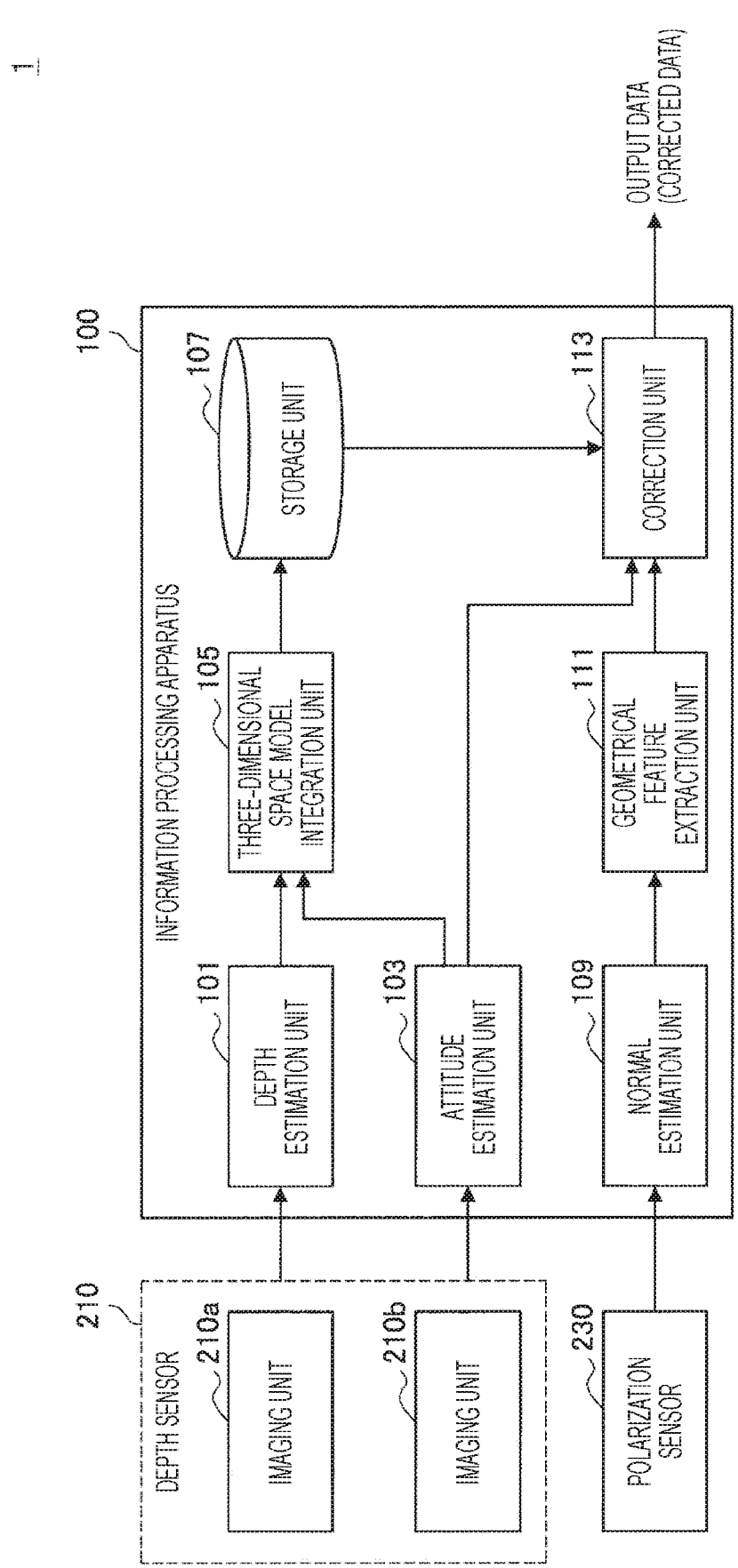
FIG. 3 is a function block diagram illustrating an example of a functional configuration of the information processing system according to the embodiment.

First, an example of a functional configuration of the information processing system 1 according to the present embodiment is described with reference to FIG. 3. FIG. 3 is a function block diagram illustrating an example of a functional configuration of the information processing system 1 according to the present embodiment.

As illustrated in FIG. 3, the information processing system 1 according to the present embodiment includes the depth sensor 210, the polarization sensor 230, and the information processing apparatus 100. Note that a detailed description of the depth sensor 210 and the polarization sensor 230 will be omitted because it is similar to the example described with reference to FIG. 1. Furthermore, in the present description, the depth sensor 210 is described to be configured as a stereo camera. In other words, the depth sensor 210 includes the imaging units 210a and 210b that image an image of an object positioned on a real space from mutually different viewpoints.

The information processing apparatus 100 includes a depth estimation unit 101, an attitude estimation unit 103, a three-dimensional space model integration unit 105, a storage unit 107, a normal estimation unit 109, a geometrical feature extraction unit 111, and a correction unit 113.

The depth estimation unit 101 acquires depth information from the depth sensor 210, and estimates a distance between a predetermined viewpoint and an object positioned on a real space on the basis of the acquired depth information. As a specific example, the depth estimation unit 101 acquires images imaged by the imaging units 210a and 210b from the depth sensor 210, and generates, on the basis of a parallax between the acquired images, a depth map on which the results of the estimation of the distance between the predetermined viewpoint and the subject are mapped on an imaged plane surface. Then, the depth estimation unit 101 outputs the generated depth map to the three-dimensional space model integration unit 105.

The attitude estimation unit 103, in a case where the depth sensor 210 is configured to be capable of movement, estimates at least one of the position and the attitude of the depth sensor 210 on the real space. As a specific example, the attitude estimation unit 103 may estimate the position and the attitude of the depth sensor 210 on the real space on the basis of technologies, such as SLAM. Note that, depending on a method for estimating the position and the attitude of the depth sensor 210, a configuration for achieving the method may be added properly. For example, in a case where the position and the attitude of the depth sensor 210 on the real space is estimated on the basis of SLAM, various sensors for detecting a relative change in position and attitude of the depth sensor 210 may be provided. Then, the attitude estimation unit 103 outputs results of the estimation of the position and the attitude of the depth sensor 210 on the real space to the three-dimensional space model integration unit 105 and the correction unit 113.

Note that, a case where the depth sensor 210 is fixed in a predetermined position on the real space can also be assumed. In this case, when information indicating the position of the depth sensor 210 on the real space is preliminarily acquired, the position of the depth sensor 210 can be handled as known information. In other words, in this case, the attitude estimation unit 103 may not be provided.

The three-dimensional space model integration unit 105 acquires the generated depth map from the depth estimation unit 101. Furthermore, the three-dimensional space model integration unit 105 acquires information indicating results of the estimation of at least one of the position and the attitude of the depth sensor 210 during acquisition of depth information (e.g., images imaged by the imaging units 201*a* and 201*b*), which is a source for the generation of the depth map, from the attitude estimation unit 103. Then, the three-dimensional space model integration unit 105 integrates the acquired depth map as a three-dimensional space model depending on the position and the attitude of the depth sensor 210 on the basis of the aforementioned results of the estimation acquired. Note that, as described above, examples of the method for integrating depth maps into a three-dimensional space model include a method for expressing the three-dimensional space as an isosurface of a distance field and a method for expressing a three-dimensional space using a point cloud of results of estimation of distance. As the three-dimensional space model, for example, truncated signed distance function (TSDF) on voxel volume can be used.

Data integrated as the three-dimensional space model is stored in a predetermined storage region. For example, the storage unit 107 is a storage region for temporarily or permanently storing various data. In other words, data integrated as the three-dimensional space model may be stored in the storage unit 107.

Furthermore, the three-dimensional space model integration unit 105 estimates a three-dimensional shape of a real object on the basis of the three-dimensional space model generated in the manner described above, and causes the storage unit 107 to store the information regarding the results of the estimation of the shape.

Specifically, the three-dimensional space model integration unit 105 extracts a polygon mesh of the real object, which is a target for shape estimation, on the basis of the three-dimensional space model. As a more specific example, in a case where TSDF is used as the three-dimensional space model, for example, a method, e.g., Marching Cubes or Dual Contouring, is used to extract a surface of $f(x)=0$ such that a polygon mesh can be extracted. Note that, in the above relational expression, f indicates distance field and x indicates three-dimensional position. Furthermore, in a case where the three-dimensional space model is a point cloud, a method, e.g., Poisson Surface Reconstruction or Screened Poisson Surface Reconstruction, may be used. Here, in a case where Screened Poisson Surface Reconstruction is used, a plurality of frames of the aforementioned boundary map is used to generate a point cloud of features so as to generate a high-precision polygon mesh with such restrictions that the point is passed through. Note that the generated polygon mesh corresponds to an example of the information regarding the results of the estimation of the three-dimensional shape of the real object.

The normal estimation unit 109 acquires polarization information from the polarization sensor 230, and generates a normal map on which a distribution of normal vectors of the outer surfaces of the real object positioned in a space (i.e., real space), which is a target for acquisition of polarization information, is mapped on the basis of the acquired polarization information.

For example, FIG. 4 is an explanatory view for explaining an example of data used for estimation of the shape of an object in the information processing system 1 according to the present embodiment. Among various data illustrated in FIG. 4, the drawing illustrated on the left side corresponds to an example of the normal map.

As a specific example, the normal estimation unit 109, on the basis of the polarization image having three or more polarization directions, determines a relationship between luminance and polarization angle depending on the polarization directions and the luminance of the polarization image, and distinguishes an azimuth of the maximum luminance. Specifically, the normal estimation unit 109 determines an azimuth by fitting polarization values of three or more polarizations whose polarization directions are mutually different to a cosine curve. Next, the normal estimation unit 109 calculates a polarization degree on the basis of the maximum luminance and the minimum luminance obtained from the relationship between luminance and polarization angle, and distinguishes a zenith angle corresponding to the calculated polarization degree on the basis of characteristics indicating the relationship between the polarization degree and the zenith angle. Specifically, the normal estimation unit 109 determines the maximum value and the minimum value of the polarization from the cosine curve, calculates a polarization degree on the basis of the maximum value and the minimum value, and calculates a zenith angle depending on the polarization degree.

Thus, the normal estimation unit 109 generates a normal map by determining normal information (i.e., azimuth and zenith angle) of an object (real object) on the real space on the basis of the polarization image having three or more polarization directions with respect to each pixel position. Then, the normal estimation unit 109 outputs the generated normal map to the geometrical feature extraction unit 111.

The geometrical feature extraction unit 111 acquires the normal map from the normal estimation unit 109 and extracts a part indicating a geometrical feature from the acquired normal map to estimate the geometrical feature of the real object. As a specific example, the geometrical feature extraction unit 111 calculates an inner product of a normal of a pixel on the normal map and a normal of a pixel positioned in the vicinity, and extracts pixels whose minimum value is a threshold value or less as boundary pixels corresponding to a boundary between surfaces (e.g., edge, corner, or the like). Thus, the geometrical feature extraction unit 111 extracts the boundary pixels from the normal map to generate a boundary map on which a distribution of boundary pixels is mapped.

For example, the drawing illustrated in the middle of FIG. 4 illustrates an example of the boundary map generated on the basis of the normal map illustrated as the left-hand drawing of FIG. 4. In other words, the boundary map illustrated as the middle drawing of FIG. 4 presents that a part presumed to be a boundary between surfaces among the outer surfaces of the real object (i.e., a part whose certainty of being the boundary is equal to or more than a threshold value) is distinguishable from other parts.

Next, the geometrical feature extraction unit 111 generates a geometrical feature map by extracting boundary segment information from the generated boundary map. Note that, for extraction of the boundary segment information, for example, a method, e.g., a line segment detector (LCD), can be used. Thus, it is possible to extract a part (line segment) corresponding to an edge of the object from the boundary map. Furthermore, as another example, the geometrical feature extraction unit 111 may extract a part corresponding to an edge by approximating the boundary pixel indicated on the boundary map by a line segment.

Furthermore, the geometrical feature extraction unit 111 couples a plurality of endpoints whose distance is equal to or less than a threshold value among endpoints of line segments corresponding to edges of an object extracted from the boundary map, and recognizes the endpoints as one endpoint.

Figure 5:
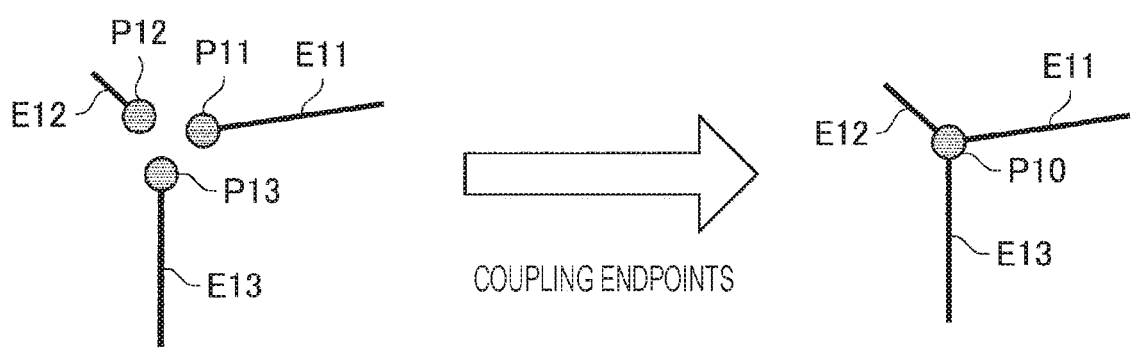
FIG. 5 is an explanatory view for explaining an overview of processing for estimation of a geometrical feature of a real object.

For example, FIG. 5 is an explanatory view for explaining an overview of processing for estimation of the geometrical feature of the real object. In the drawing illustrated on the left side of FIG. 5, each of reference characters E11 to E13 schematically indicates a line segment corresponding to an edge extracted from the boundary map. Furthermore, each of reference characters P11 to P13 schematically indicates an endpoint of the line segments E11 to E13. In other words, the drawing illustrated on the left side of FIG. 5 illustrates an example of a case where the endpoints P11 to P13 of the line segments E11 to E13 are positioned in the vicinity with respect to one another. In such a case, as illustrated in the right-hand drawing of FIG. 5, the geometrical feature extraction unit 111 couples the endpoints P11 to P13 positioned in the vicinity with respect to one another, and recognizes the endpoints as one endpoint P10. Thus, a part presumed to be a corner of the object is extracted.

Thus, the geometrical feature extraction unit 111 generates the geometrical feature map. For example, the right-hand drawing of FIG. 4 corresponds to an example of the geometrical feature map generated on the basis of the boundary map illustrated in the middle drawing of FIG. 4. Then, the geometrical feature extraction unit 111 outputs the generated geometrical feature map and the normal map, which is a source for generation of the geometrical feature map, to the correction unit 113.

The correction unit 113 acquires information regarding the results of the estimation of the three-dimensional shape of the aforementioned real object, and corrects the acquired information on the basis of the aforementioned geometrical feature map and normal map.

Specifically, the correction unit 113 extracts the information regarding the results of the estimation of the three-dimensional shape of the real object, which is a target, from the storage unit 107. Note that, in a subsequent description, a description is given of the extraction of a polygon mesh that reproduces the shape of the real object as the information regarding the results of the estimation of the three-dimensional shape of the real object. Furthermore, the correction unit 113 acquires a geometrical feature map and a normal map from the geometrical feature extraction unit 111.

Next, the correction unit 113 estimates a boundary of the surfaces among the actual outer surfaces of the real object, which is a target, on the basis of the acquired geometrical feature map. For example, FIG. 6 is an explanatory view for explaining an example of processing for estimating a boundary between surfaces on the basis of the geometrical feature map and the normal map.

Figure 6:
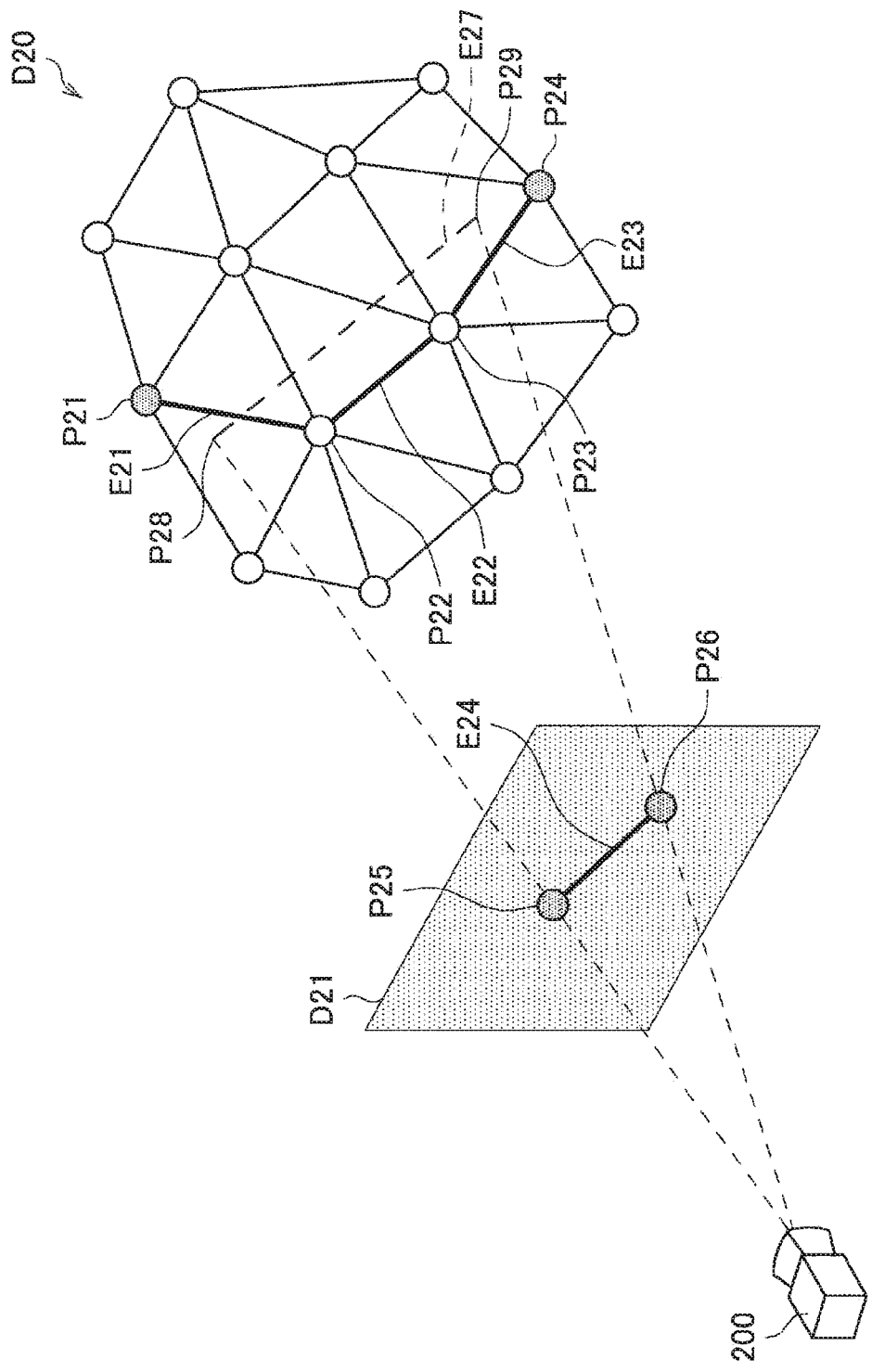
FIG. 6 is an explanatory view for explaining an example of processing for estimation of a boundary between surfaces on the basis of a geometrical feature map and a normal map.

Specifically, first, as illustrated in FIG. 6, the correction unit 113 projects endpoints of a line segment indicated on the geometrical feature map onto a polygon mesh depending on the capture position corresponding to the geometrical feature map to extract endpoints of a feature line corresponding to the line segment.

For example, in FIG. 6, reference character 200 indicates the aforementioned capture position, which namely corresponds to the position and the attitude of the polarization sensor 230 on the real space when the polarization image, which is a source for generation of the geometrical feature map, is captured. Furthermore, reference character D21 indicates a geometrical feature map, and reference character D20 indicates a polygon mesh (i.e., results of shape estimation) of a real object, which is a target. Furthermore, reference character E24 corresponds to a line segment indicated on the geometrical feature map D21, and reference characters P25 and P26 correspond to endpoints of the line segment E24.

In the example illustrated in FIG. 6, the correction unit 113 extends straight lines connecting the capture position 200 and the endpoints P25 and P26 to the polygon mesh D20, and calculates points P28 and P29 at which the straight lines cross the polygon mesh D20. In other words, a line segment E27 connecting the point P28 and the point P29 on the polygon mesh D20 corresponds to the line segment E24 indicated on the geometrical feature map D21.

Next, the correction unit 113 extracts vertices positioned in the vicinity of the points P28 and P29 among vertices constituting the polygon mesh D20 as the endpoints of the feature line corresponding to the line segment E24 on the geometrical feature map D21. For example, in the example illustrated in FIG. 6, vertices P21 and P24 are extracted as the endpoints of the feature line.

Next, the correction unit 113 extracts a polyline (i.e., one or more sides) connecting the vertices P21 and P24 on the polygon mesh D20, and extracts the vertices on the polyline as candidate points of the feature line. For example, in the example illustrated in FIG. 6, vertices P22 and P23 on a series of sides E21, E22 and E23 connecting the vertices P21 and P24 are extracted as candidate points of the feature line. Note that each segment (e.g., the sides E21, E22 and E23 illustrated in FIG. 6) of the feature line can be estimated to be a part corresponding to a boundary of mutually adjacent surfaces among the actual outer surfaces of the real object, which is a target.

Next, the correction unit 113 corrects the polygon mesh D20 on the basis of the acquired normal map and the results of the estimation of the boundary of the mutually adjacent surfaces among the actual surfaces of the real object, which is a target. For example, FIG. 7 and FIG. 8 are explanatory views for explaining an example of the processing for correction of the polygon mesh D20.

Figure 7:
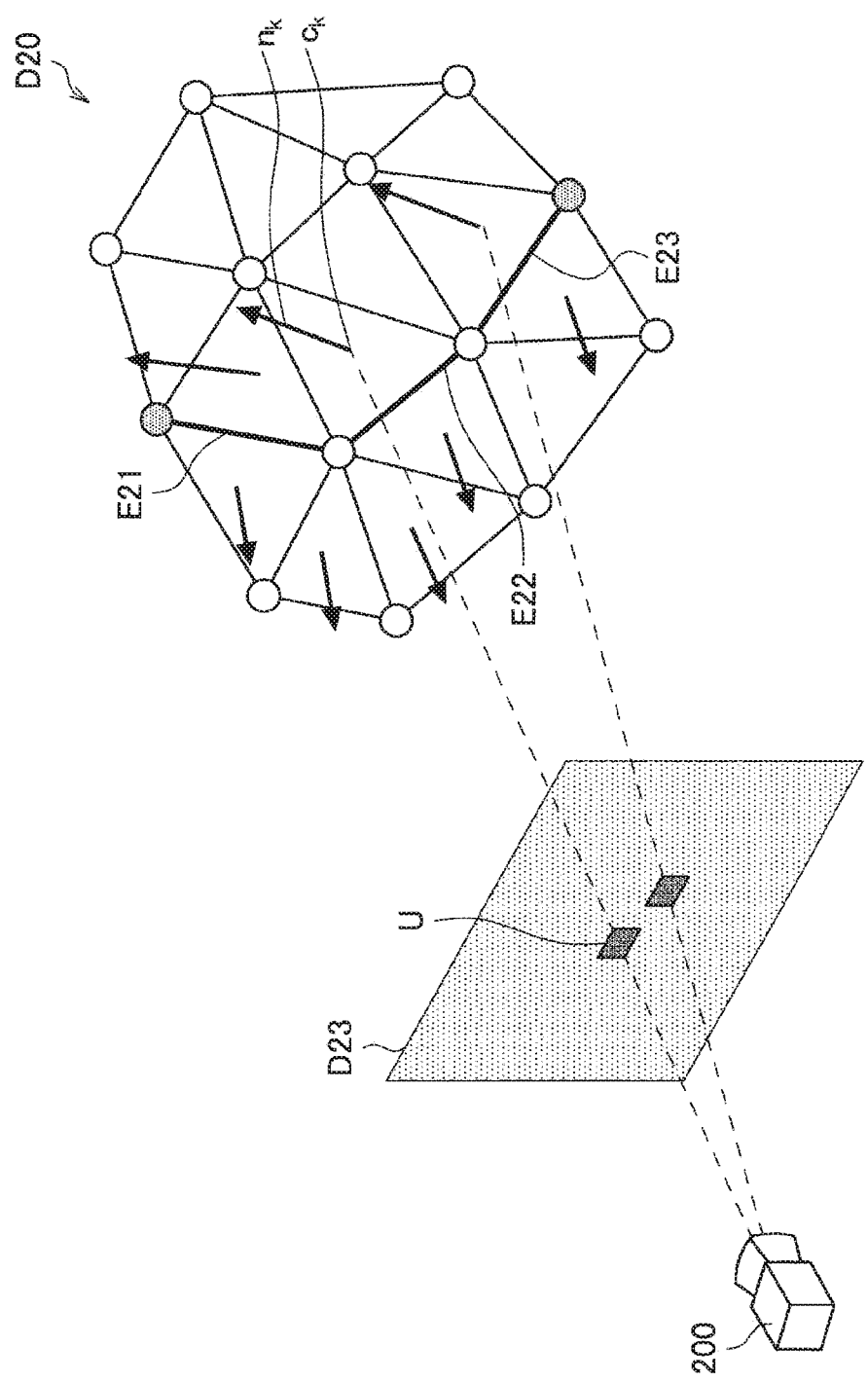
FIG. 7 is an explanatory view for explaining an example of processing for correction of a polygon mesh.
Figure 8:
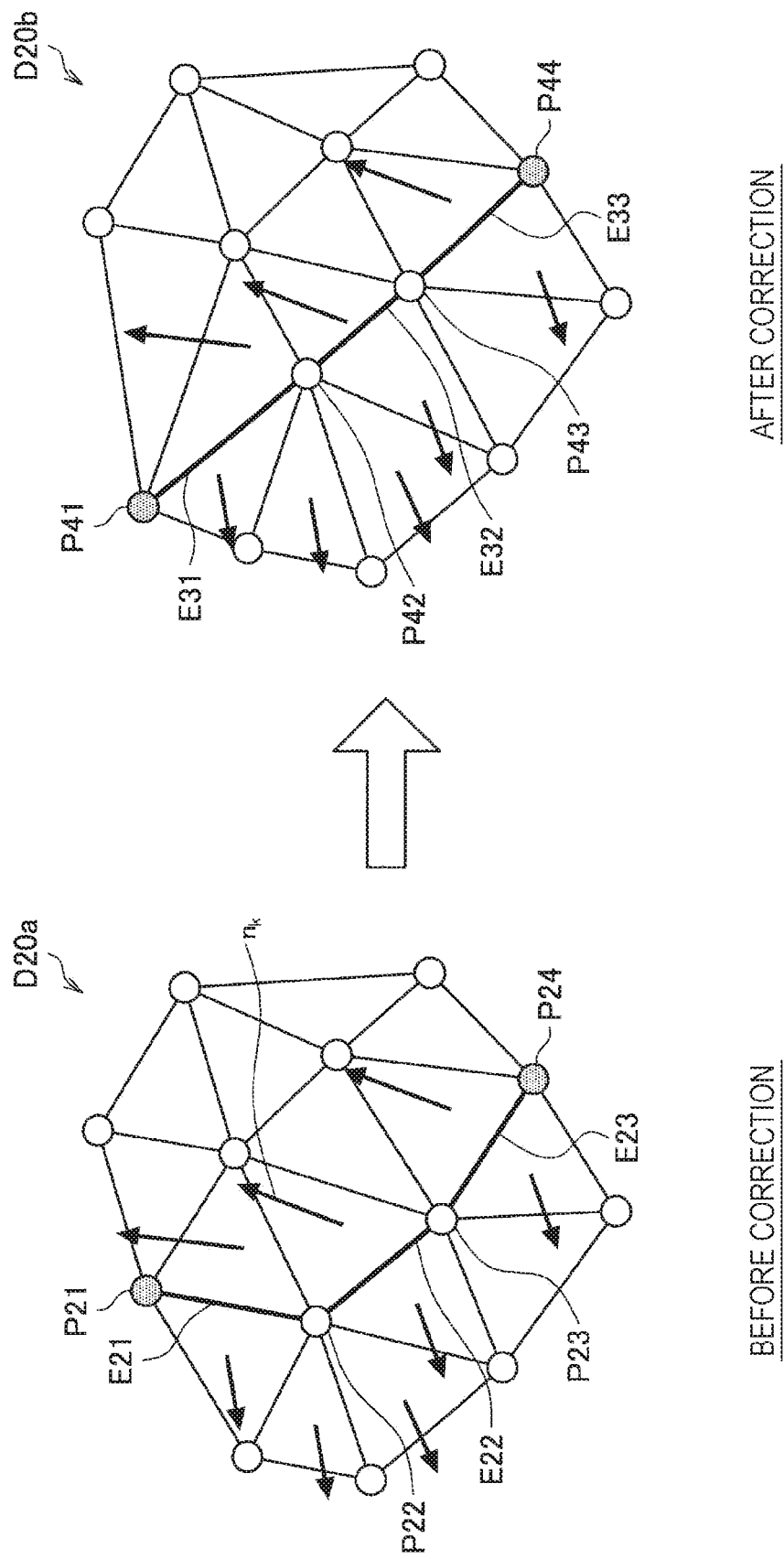
FIG. 8 is an explanatory view for explaining an example of processing for correction of a polygon mesh.

Specifically, the correction unit 113, first, as illustrated in FIG. 7, projects the centers of gravity of surfaces regarding surfaces including at least a part of the feature line of the polygon mesh D20 onto the normal map.

For example, in FIG. 7, reference character $c_k$ indicates the center of gravity of a surface including the side E22, which is at least a part of the feature line. Reference character D23 indicates the normal map, and reference character u indicates a point (hereinafter also called the "projection point") on the normal map onto which the center of gravity $c_k$ is projected. Note that projection point u on the normal map is calculated on the basis of a relational expression indicated below as (Formula 1) on the basis of the aforementioned center of gravity $c_k$ and a matrix K depending on the positional relationship between the capture position 200, the normal map D23, and the polygon mesh D20.

[Mathematical 1]

$$u = Kc_k \qquad \text{(Formula 1)}$$

Next, the correction unit 113 estimates the normal vector of the projection point u calculated on the normal map as an ideal normal of the surface within the polygon mesh D20 corresponding to the center of gravity $c_k$, which is the origin for projection of the projection point u. For example, in FIG. 7, reference character $n_k$ schematically indicates an ideal normal of the surface corresponding to the center of gravity $c_k$.

Thus, the correction unit 113 estimates ideal normal $n_k$ with respect to each surface including at least a part of the feature line of the polygon mesh D20.

Next, the correction unit 113 corrects the polygon mesh D20 such that the normal of the surface of the polygon mesh D20 becomes closer to the ideal normal $n_k$ estimated regarding the surface, which includes at least a part of the feature line.

Specifically, the correction unit 113 corrects the polygon mesh D20 by shifting the position of the vertices on the feature line of the polygon mesh D20 to position p calculated by minimizing the formula indicated as (Formula 2) below.

[Mathematical 2]

$$p = \min_p \left( \sum_i \left\| \sum_{j \in N(i)} w_{ij}(p_i - p_j) - \sum_{t_k \in T(p_i)} n_k \right\|^2 + \lambda \sum_{i \in P'} \|p_i - v_i\|^2 \right) \quad \text{(Formula 2)}$$

Note that, in the aforementioned (Formula 2), T indicates a cluster of surfaces including at least a part of the feature line, and P indicates a cluster of vertices included in the cluster T. Furthermore, N(i) indicates a cluster of adjacent vertices of $p_i$. The symbol P', which is a partial cluster of P, is a cluster of vertices that give positional restrictions, and $v_i$ indicates restriction position. Furthermore, $t_k$ indicates an element of T, and λ indicates weight. Furthermore, $w_{ij}$ indicates weight for calculation of discrete Laplacian. Examples of a method for calculating $w_{ij}$ include cotangent formula.

For example, a polygon mesh D20a illustrated in the left-hand drawing of FIG. 8 indicates a pre-correction polygon mesh D20. Furthermore, a polygon mesh D20b illustrated in the right-hand drawing of FIG. 8 indicates a corrected polygonal mesh D20.

In the example of FIG. 8, the series of sides E21, E22 and E23 corresponds to the feature line, and the vertices P22 and P23 correspond to the vertices on the feature line. Therefore, in the example illustrated in FIG. 8, the correction unit 113 corrects the polygon mesh D20 by shifting the positions of the vertices P22 and P23. For example, vertices P41 to P44 of the polygon mesh D20b correspond to the vertices P21 to P24 of the polygon mesh D20a. Furthermore, sides E31, E32 and E33 of the polygon mesh D20b correspond to the sides E21, E22 and E23 of the polygon mesh D20a.

Note that the correction unit 113 may not correct the positions of other vertices other than the vertices on the feature line among the vertices included in the cluster P.

Thus, the correction unit 113 corrects the information (e.g., polygon mesh) regarding the results of the estimation of the three-dimensional shape of the real object on the basis of the acquired geometrical feature map and normal map, and outputs the corrected information to a predetermined output destination as output data.

Note that, a part of the correction unit 113 that acquires a variety of information including the information regarding the results of the estimation of the three-dimensional shape of the real object, the geometrical feature map, the normal map, and the like, corresponds to an example of the "acquisition unit." Furthermore, the information regarding the results of the estimation of the three-dimensional shape of the real object (e.g., polygon mesh) corresponds to an example of the "first information," and the geometrical feature map corresponds to an example of the "second information."

Furthermore, the aforementioned functional configuration of the information processing system 1 is a mere example, and, as far as the aforementioned functions can be achieved, the functional configuration of the information processing system 1 according to the present embodiment is not necessarily limited to the example illustrated in FIG. 3. For example, among the configurations of the information processing apparatus 100, some of the configurations may be externally provided with respect to the information processing apparatus 100. More specifically, among the configurations of the information processing apparatus 100, a part for integration of the depth maps into the three-dimensional space model and a part for generation of the polygon mesh on the basis of the three-dimensional space model may be externally provided with respect to the information processing apparatus 100. Furthermore, as another example, the functions of the information processing apparatus 100 may be achieved by a cooperative operation of a plurality of apparatuses. Furthermore, as another example, the information processing apparatus 100, the depth sensor 210, and the polarization sensor 230 may be integrally configured. Furthermore, as another example, the three-dimensional space model integration unit 105 may directly output the information regarding the results of the estimation of the three-dimensional shape of the real object to the correction unit 113 not via the storage unit 107. Such a configuration can cause, for example, the estimation of the three-dimensional shape of the real object, which is a target, and the correction of the results of the estimation of the shape to be executed in real time.

Heretofore, an example of the functional configuration of the information processing system 1 according to the present embodiment has been described with reference to FIG. 3.

<3.2. Processing>

Figure 9:
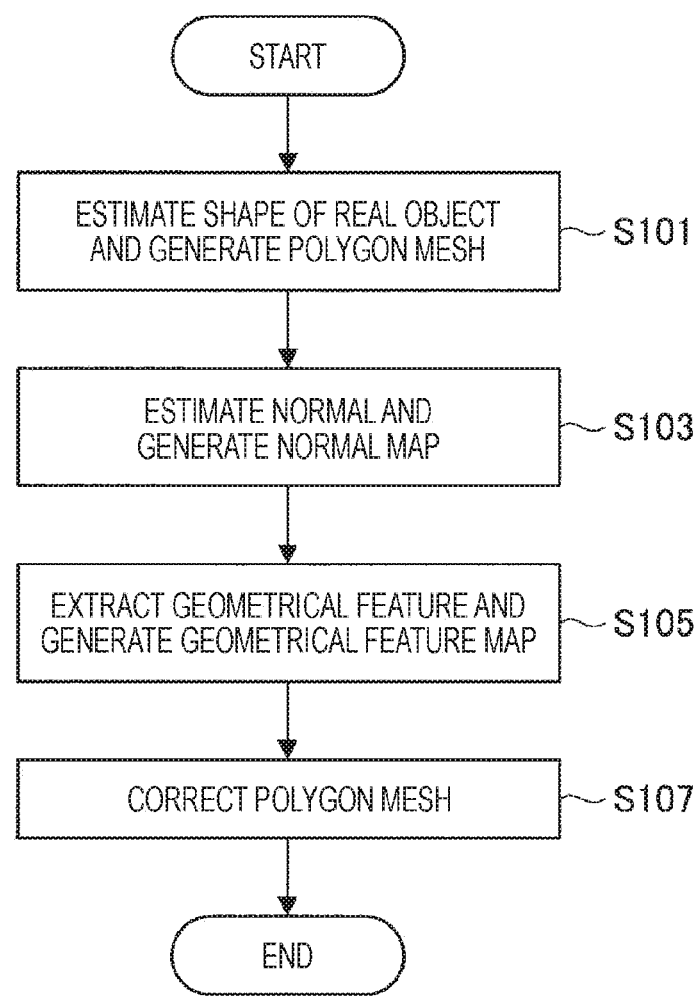
FIG. 9 is a flowchart illustrating an example of flow of a series of processing of the information processing system of the embodiment.

Next, an example of flow of a series of processing of the information processing system 1 according to the present embodiment is described with a particular focus on the flow of processing for the estimation of the shape of the real space and the correction of the results of the estimation by the information processing apparatus 100 with reference to FIG. 9. FIG. 9 is a flowchart illustrating an example of flow of a series of processing of the information processing system 1 according to the present embodiment.

As illustrated in FIG. 9, first, the information processing apparatus 100 (depth estimation unit 101) acquires the depth information from the depth sensor 210, and generates, on the basis of the acquired depth information, a depth map on which the results of the estimation of the distance between the predetermined viewpoint and the object positioned on the real space are mapped on an imaged plane surface. Furthermore, the information processing apparatus 100 (attitude estimation unit 103) estimates the position and the attitude of the depth sensor 210 on the real space on the basis of technologies, e.g., SLAM. The information processing apparatus 100 (three-dimensional space model integration unit 105) integrates the generated depth map as a three-dimensional space model depending on the position and the attitude of the depth sensor 210. Furthermore, the information processing apparatus 100 (three-dimensional space model integration unit 105) extracts a polygon mesh of the object, which is a target for shape estimation, on the basis of the three-dimensional space model (S101).

Furthermore, the information processing apparatus 100 (normal estimation unit 109) acquires polarization information from the polarization sensor 230, and generates a normal map on the basis of the acquired polarization information (S103). Next, the information processing apparatus 100 (geometrical feature extraction unit 111) generates a boundary map by extracting boundary pixels corresponding to a boundary between surfaces (e.g., edge, corner, or the like) from the normal map. Then, the information processing apparatus 100 generates a geometrical feature map by extracting boundary segment information from the generated boundary map (S103). Note that the details of the processing regarding generation of the normal map, the boundary map, and the geometrical feature map are as described above.

Next, the information processing apparatus 100 (correction unit 113) corrects the polygon mesh of the real space, which is a target for shape estimation, extracted on the basis of the three-dimensional space model on the basis of the generated normal map and geometrical feature map (S107). Note that the details of the processing for the correction of the polygon mesh are as described above. Then, the information processing apparatus 100 outputs the corrected polygon mesh to a predetermined output destination as output data.

Heretofore, an example of flow of a series of processing of the information processing system 1 according to the present embodiment has been described with a particular focus on the flow of the processing for the estimation of the shape of the real space and the correction of the results of the estimation by the information processing apparatus 100 with reference to FIG. 9.

<3.3. Variation>

Next, variations of the information processing system 1 according to the present embodiment are described.

(Variation 1: An Example of Polygon Mesh Correction Method)

First, as Variation 1, another example of the polygon mesh correction method is described. In Variation 1, a description is given of an example of a method in which an approximate plane is calculated on the basis of the results of the estimation of the feature line and the approximate plane is used to correct the positions of the vertices on the feature line. For example, FIG. 10 is an explanatory view for explaining an example of the polygon mesh correction method according to Variation 1.

First, as a presupposition, similarly to the aforementioned embodiment, the information processing apparatus 100 extracts candidate points of the feature line from the polygon mesh on the basis of the geometrical feature map so as to specify the feature line. Note that, in the example illustrated in FIG. 10, the series of sides E21, E22 and E23 corresponds to the feature line of the polygon mesh D20.

Next, the information processing apparatus 100 according to the present variation calculates a circle having a predetermined radius r centered at the position spaced a predetermined distance ε in a direction perpendicular to the line segment E24 from the middle point of the line segment E24 corresponding to the feature line on the geometrical feature map D21. Furthermore, the information processing apparatus 100 calculates a normal vector of each pixel (i.e., pixel of the geometrical feature map D21) in the calculated circle. Next, the information processing apparatus 100 projects the pixels in the calculated circle to the polygon mesh D20 and calculates vertices in the circle projected on the polygon mesh D20.

The information processing apparatus 100 calculates an approximate plane on the basis of the calculated normal and vertices. Note that two approximate planes are calculated with respect to one feature line. For example, in the example of FIG. 10, reference characters D41 and D43 schematically indicate approximate planes calculated with respect to features line corresponding to the series of sides E21, E22 and E23.

Then, the information processing apparatus 100 projects the vertices on the feature line of the polygon mesh D20 to the approximate planes D41 and D43, and corrects the positions of the vertices on the basis of the results of the projection. The information processing apparatus 100 executes the aforementioned processing on each of the approximate planes calculated with respect to each feature line to correct the polygon mesh D20.

Thus, in the present variation, a boundary between two approximate planes calculated with respect to one feature line is estimated to correspond to a boundary of mutually adjacent two surfaces among the actual outer surfaces of the real object, which is a target of shape estimation.

Heretofore, another example of the polygon mesh correction method has been described with reference to FIG. 10 as Variation 1.

(Variation 2: An Example of Polygon Mesh Correction Method)

Next, as Variation 2, another example of the polygon mesh correction method is described. In the aforementioned embodiment and variation, a description is given of an example of the method in which a feature line on the polygon mesh corresponding to sides on the geometrical feature map is specified, and the feature line is used to correct the polygon mesh. Meanwhile, in Variation 2, a description is given of an example of a method in which vertices on the polygon mesh corresponding to endpoints of a side on the geometrical feature map are specified as feature points, and the feature points are used to correct the polygon mesh. For example, FIG. 11 and FIG. 12 are explanatory views for explaining an example of the polygon mesh correction method according to Variation 2.

Specifically, the information processing apparatus 100 extracts a feature point by projecting endpoints of line segments indicated on the geometrical feature map onto the polygon mesh depending on the capture position corresponding to the geometrical feature map.

Figure 11:
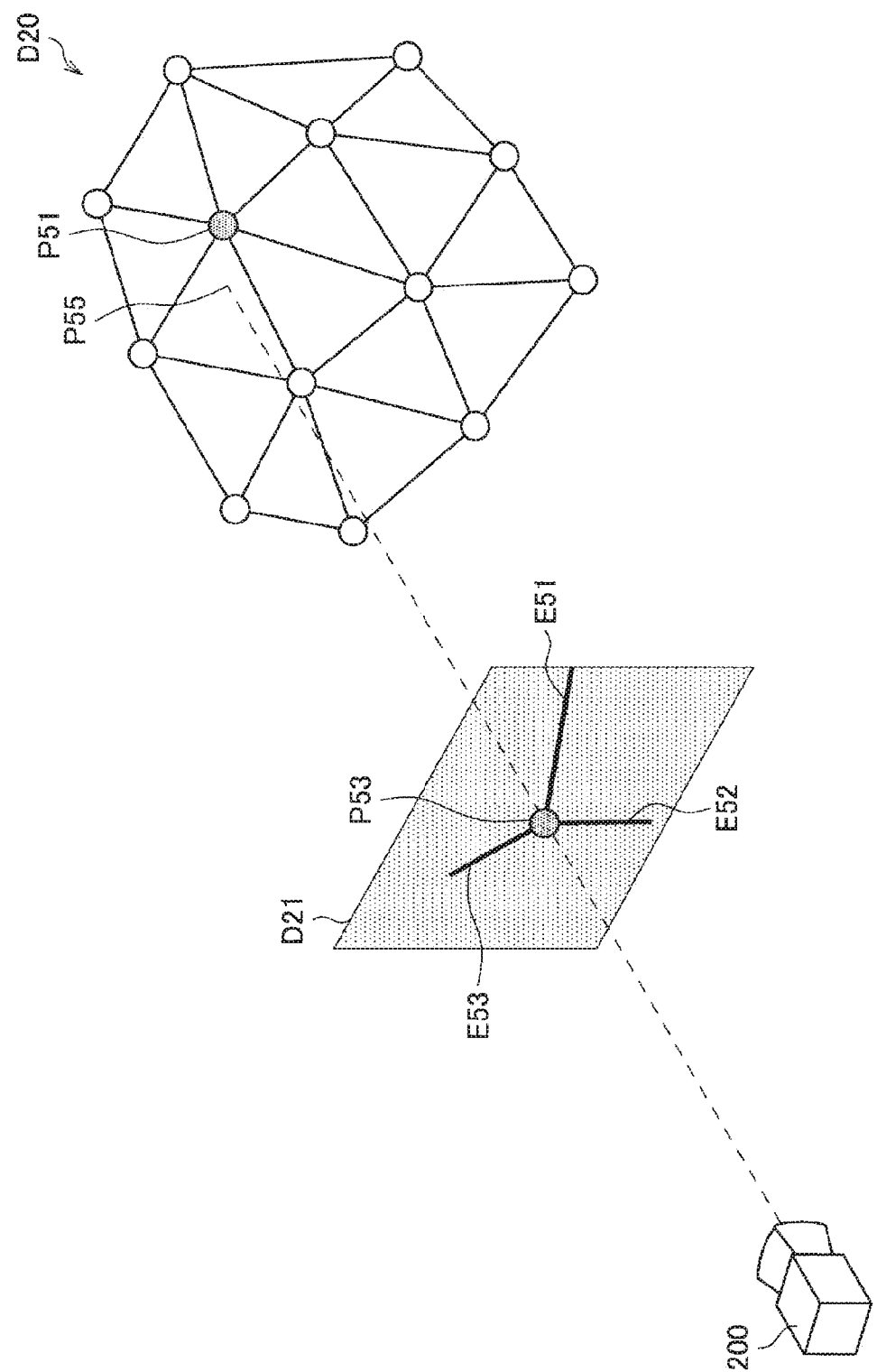
FIG. 11 is an explanatory view for explaining an example of a polygon mesh correction method according to Variation 2.
Figure 12:
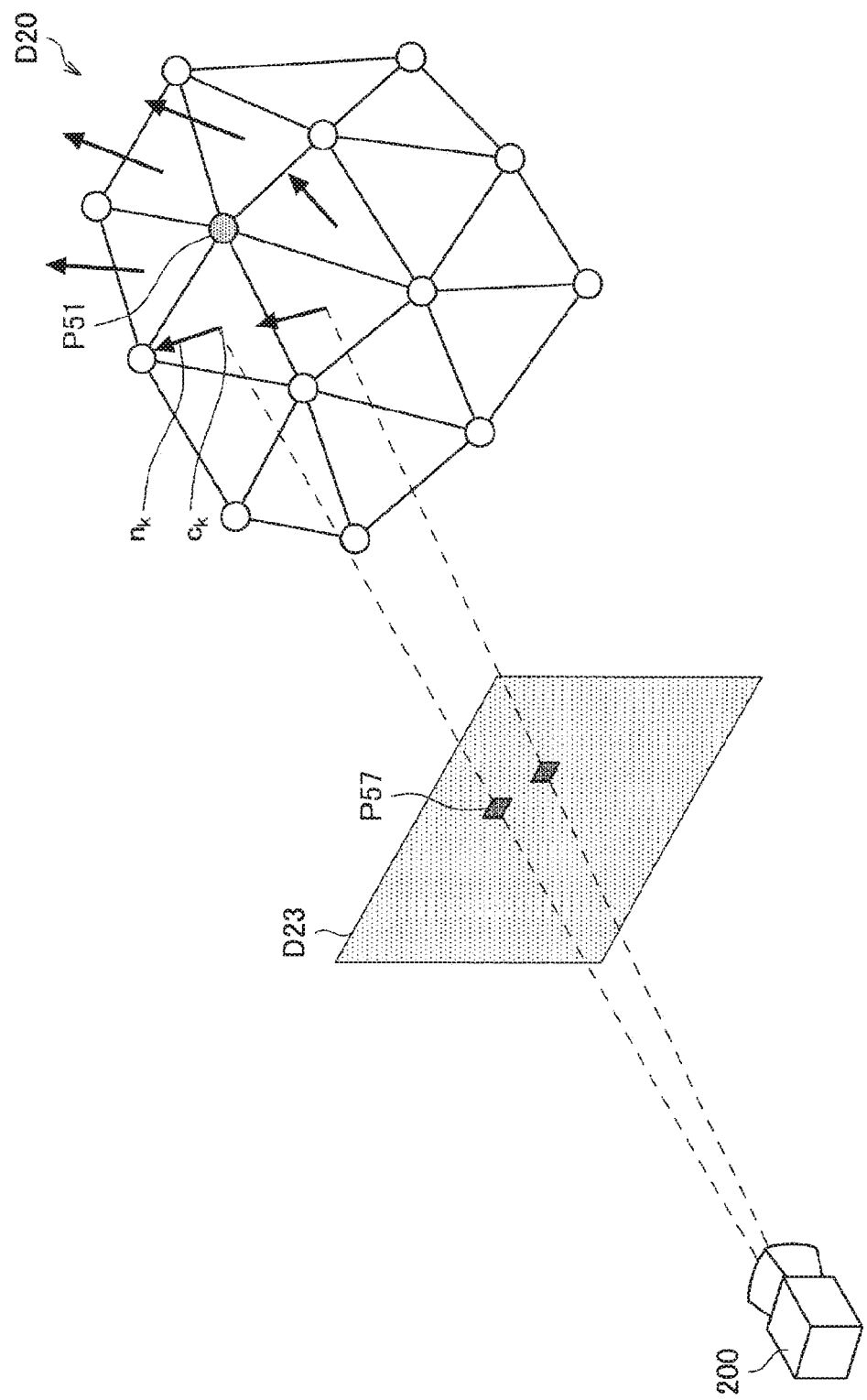
FIG. 12 is an explanatory view for explaining an example of the polygon mesh correction method according to Variation 2.

For example, in FIG. 11, reference character P53 indicates an endpoint of sides E51, E52 and E53 on the geometrical feature map D21. The information processing apparatus 100 extends a straight line connecting the capture position 200 and the endpoint P53 to the polygon mesh D20, and calculates a point P55 at which the straight line crosses the polygon mesh D20. Next, the information processing apparatus 100 extracts a vertex positioned in the vicinity of the point P55 among the vertices constituting the polygon mesh D20, as a feature point P51.

Next, the information processing apparatus 100 specifies a surface including the extracted feature point among the surfaces constituting the polygon mesh and projects the center of gravity of the specified surface onto the normal map.

For example, in FIG. 12, reference character $c_k$ indicates the center of gravity of a surface including feature point P51. Furthermore, reference character P57 indicates a projection point on the normal map D23 on which the center of gravity $c_k$ is projected. Note that the method for calculating the projection point P57 is similar to that of the example described above with reference to (Formula 1), and therefore a detailed description is omitted.

Next, the information processing apparatus 100 estimates the normal vector at the projection point u calculated on the normal map, as an ideal normal of the surface of the polygon mesh D20 corresponding to the center of gravity $c_k$, which is the origin for projection of the projection point u. For example, in FIG. 12, the reference character $n_k$ schematically indicates an ideal normal of the surface corresponding to the center of gravity $c_k$.

Thus, the information processing apparatus 100 calculates an ideal normal with respect to each surface including the feature point P51, shifts the positions of at least some vertices of the vertices of the polygon mesh D20 on the basis of the results of the calculation of the ideal normal, and corrects the polygon mesh D20. As a more specific example, the information processing apparatus 100 may shift the feature point to position p calculated by minimizing the aforementioned (Formula 2). Here, T indicates a cluster of surfaces including the feature point.

Heretofore, another example of the polygon mesh correction method has been described with reference to FIG. 11 and FIG. 12 as Variation 2.

4. HARDWARE CONFIGURATION

Figure 13:
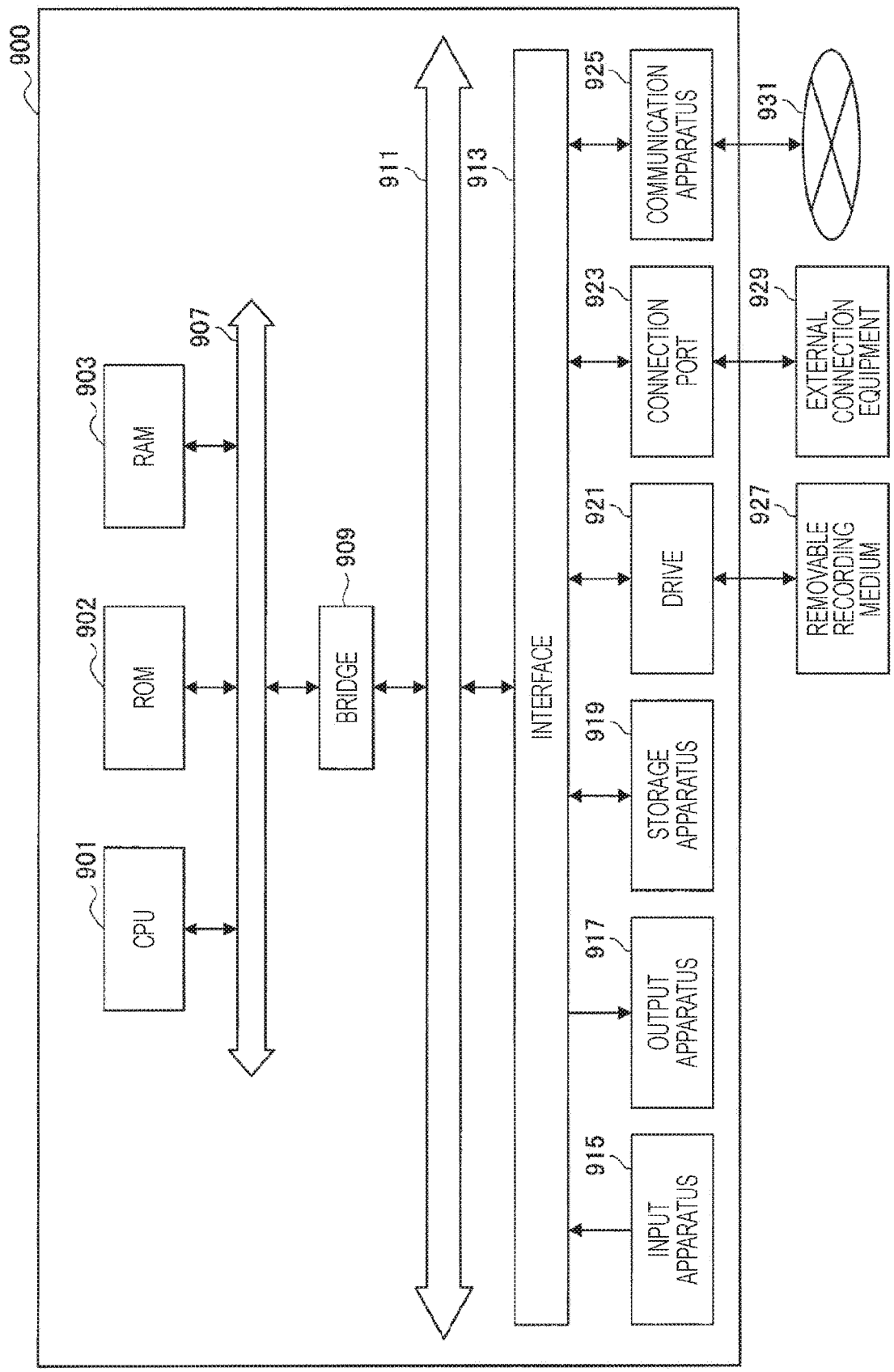
FIG. 13 is a function block diagram illustrating a configuration example of a hardware configuration of an information processing apparatus constituting the information processing system according to the embodiment.

Next, with reference to FIG. 13, as with the aforementioned information processing apparatus 100, a detailed description is given of an example of a hardware configuration of an information processing apparatus constituting an information processing system according to an embodiment of the present disclosure. FIG. 13 is a function block diagram illustrating a configuration example of a hardware configuration of an information processing apparatus constituting an information processing system according to an embodiment of the present disclosure.

An information processing apparatus 900 constituting the information processing system according to the present embodiment mainly includes a CPU 901, a ROM 902, and a RAM 903. Moreover, the information processing apparatus 900 further includes a host bus 907, a bridge 909, an external bus 911, an interface 913, an input apparatus 915, an output apparatus 917, a storage apparatus 919, a drive 921, a connection port 923, and a communication apparatus 925.

The CPU 901 functions as an arithmetic processing apparatus and a control apparatus, and controls general or partial operation in the information processing apparatus 900 according to various programs recorded on the ROM 902, the RAM 903, the storage apparatus 919, or a removable recording medium 927. The ROM 902 stores a program, an arithmetic parameter, or the like the CPU 901 uses. The RAM 903 primarily stores a program used by the CPU 901, a parameter that is properly changed by execution of the program, or the like. These are mutually connected by the host bus 907 including an internal bus, e.g., a CPU bus. For example, the CPU 901 can include the depth estimation unit 101, the attitude estimation unit 103, the three-dimensional space model integration unit 105, the normal estimation unit 109, the geometrical feature extraction unit 111, and the correction unit 113, illustrated in FIG. 3.

The host bus 907 is connected to an external bus 911, e.g., a peripheral component interconnect/interface (PCI) bus, via the bridge 909. Furthermore, the input apparatus 915, the output apparatus 917, the storage apparatus 919, the drive 921, the connection port 923, and the communication apparatus 925 are connected to the external bus 911 via the interface 913.

The input apparatus 915 is an operation means operated by a user, e.g., a mouse, a keyboard, a touch panel, a button, a switch, a lever, a pedal, or the like. Furthermore, the input apparatus 915 may, for example, be a remote control means (so-called, a remote controller) that uses an infrared ray or other radio waves or may be external connection equipment 929, e.g., a mobile phone or a PDA, corresponding to operations of the information processing apparatus 900. Moreover, the input apparatus 915 includes, for example, an input control circuit and the like that generate an input signal on the basis of information input by the user using the aforementioned operation means and output the input signal to the CPU 901. The user of the information processing apparatus 900 is capable of inputting a variety of data to the information processing apparatus 900 and giving an instruction of processing operation by operating the input apparatus 915.

The output apparatus 917 includes an apparatus that can visually and aurally notify the user of the acquired information. Such an apparatus includes, for example, a display apparatus including a CRT display apparatus, a liquid crystal display apparatus, a plasma display apparatus, an EL display apparatus, a lamp, and the like; an audio output apparatus including a speaker, a headphone, and the like; and a printer apparatus. The output apparatus 917 outputs, for example, a result obtained by a variety of processing performed by the information processing apparatus 900. Specifically, the display apparatus displays the result obtained by a variety of processing performed by the information processing apparatus 900 as a text or an image. Meanwhile, the audio output apparatus converts an audio signal including reproduced audio data, acoustic data, or the like to an analog signal and outputs the signal.

The storage apparatus 919 is a data storage apparatus configured as an example of the storage unit of the information processing apparatus 900. The storage apparatus 919 includes, for example, a magnetic storage unit device, e.g., hard disk drive (HDD), a semiconductor storage device, an optical storage device, or a magneto-optical storage device. The storage apparatus 919 stores a program executed by the CPU 901, various data, or the like. For example, the storage unit 107 illustrated in FIG. 3 can include the storage apparatus 919.

The drive 921 is a recording medium reader/writer, and is internally or externally mounted on the information processing apparatus 900. The drive 921 reads information recorded on the mounted removable recording medium 927, e.g., a magnetic disk, an optical disk, a magneto-optical disk, or a semiconductor memory, and outputs the information to the RAM 903. Furthermore, the drive 921 can write record on the mounted removable recording medium 927, e.g., the magnetic disk, the optical disk, the magneto-optical disk, or the semiconductor memory. The removable recording medium 927 is, for example, a DVD medium, an HD-DVD medium, a Blu-ray (registered trademark) medium, or the like. Furthermore, the removable recording medium 927 may be a CompactFlash (CF) (registered trademark), a flash memory, a secure digital memory card (SD memory card), or the like. Furthermore, the removable recording medium 927 may be, for example, an integrated circuit card (IC card) including a non-contact type IC chip, electronic equipment, or the like.

The connection port 923 is a port for direct connection to the information processing apparatus 900. Examples of the connection port 923 include a universal serial bus (USB) port, an IEEE1394 port, a small computer system interface (SCSI) port, and the like. Other examples of the connection port 923 include an RS-232C port, an optical audio terminal, a high-definition multimedia interface (HDMI) (registered trademark) port, and the like. When the external connection equipment 929 is connected to the connection port 923, the information processing apparatus 900 directly acquires various data from the external connection equipment 929 and provides various data to the external connection equipment 929.

The communication apparatus 925 is, for example, a communication interface including a communication device for connection to a communication network (network) 931. The communication apparatus 925 is a communication card or the like for, for example, a wired or wireless local area network (LAN), Bluetooth (registered trademark), or wireless USB (WUSB). Furthermore, the communication apparatus 925 may be an optical communication router, an asymmetric digital subscriber line (ADSL) router, a model for various communications, or the like. The communication apparatus 925 can, for example, transmit and receive a signal and the like with respect to the Internet and other communication equipment in accordance with a predetermined protocol, e.g., TCP/IP. Furthermore, the communication network 931 connected to the communication apparatus 925 includes a network connected by wire or wirelessly and the like, and may be, for example, the Internet, home LAN, infrared communication, radio wave communication, satellite communication, or the like.

Heretofore, an example of the hardware configuration that can achieve the function of the information processing apparatus 900 constituting the information processing system according to an embodiment of the present disclosure is indicated. The aforementioned configuration elements may be configured by using general members or may be configured by hardware specialized in the functions of the configuration elements. Accordingly, depending on technological level at the time of carrying out the present embodiment, the hardware configuration to be used can be properly changed. Note that, although not illustrated in FIG. 13, various configurations corresponding to the information processing apparatus 900 constituting the information processing system are of course included.

Note that a computer program for achieving the functions of the information processing apparatus 900 constituting the aforementioned the information processing system according to the present embodiment can be produced and mounted on a personal computer or the like. Furthermore, it is also possible to provide a recording medium that stores such a computer program and can be read by a computer. The recording medium is, for example, a magnetic disk, an optical disk, a magneto-optical disk, a flash memory, or the like. Furthermore, the aforementioned computer program may be, for example, distributed via a network without use of the recording medium. Furthermore, the number of computers that execute the computer program is not particularly limited. For example, the computer program may be executed by a plurality of computers (e.g., a plurality of servers or the like) cooperating with each other.

5. CONCLUSION

As described above, with the information processing system 1 according to the present embodiment, the information processing apparatus 100 corrects the information (e.g., three-dimensionally shaped model such as polygon mesh) regarding the results of the estimation of the shape of the object (real object) on the real space on the basis of the information (e.g., geometrical feature map) regarding the results of the estimation of the geometrical feature of the object. Specifically, the information processing apparatus 100 separately estimates a geometrical feature of a part where the influence of an error, noise, or the like that occurs during measurement of the distance, e.g., a part corresponding to an edge or a corner of the object, by using a polarization image. Then, the information processing apparatus 100 corrects the results of the estimation of the part corresponding to the edge or the corner among the results of the estimation of the shape of the object depending on the results of the estimation of the geometrical feature of the part corresponding to the edge or the corner.

With such a configuration, with the information processing system 1 according to the present embodiment, in a case where the shape of the object is reproduced as a three-dimensionally shaped model or the like, the reproducibility of the shape can be further increased. Furthermore, the information processing system 1 according to the present embodiment can estimate the geometrical feature of the object without depending on the fineness of division of space regarding the estimation of the shape of the object. Therefore, the information processing system 1 according to the present embodiment enables both an increase in reproducibility (particularly, reproducibility of edge or corner part) of the three-dimensionally shaped model and suppression of an increase in data amount for reproduction of the three-dimensional shape.

The preferred embodiment(s) of the present disclosure has/have been described above with reference to the accompanying drawings, while the technical scope of the present disclosure is not limited to the above examples. A person skilled in the art may find various alterations and modifications within the scope of the appended claims, and it should be understood that they will naturally come under the technical scope of the present disclosure.

Furthermore, the effects described in this specification are merely illustrative or exemplified effects, and are not limitative. That is, with or in the place of the above effects, the technology according to the present disclosure may achieve other effects that are clear to those skilled in the art from the description of this specification.

Note that the configuration below falls within the technical scope of the present disclosure.

(1)

An information processing apparatus including:

an acquisition unit that acquires first information associated with a result of estimation of a shape of an object on a real space and second information associated with a result of estimation of a geometrical feature of the object; and a correction unit that corrects the first information on the basis of the second information.

(2)

The information processing apparatus according to (1), in which the second information includes a result of estimation of a boundary of adjacent surfaces among outer surfaces of the object.

(3)

The information processing apparatus according to (2), in which the boundary is estimated on the basis of a normal map on which a distribution of normal vectors of the outer surfaces is mapped.

(4)

The information processing apparatus according to (3), in which the normal map is generated on the basis of a polarization image of the object on the basis of a result of detection of each of a plurality of polarizations whose polarization directions are mutually different.

(5)

The information processing apparatus according to (2), in which the first information includes information associated with a result of estimation of at least some surfaces of the outer surfaces.

(6)

The information processing apparatus according to (5), in which information associated with the result of estimation of the surfaces includes mesh data that specifies a surface with a plurality of vertices and a side connecting the plurality of vertices.

(7)

The information processing apparatus according to (6), in which the correction unit corrects positions of at least some vertices among the plurality of vertices to correct the first information on the basis of the second information.

(8)

The information processing apparatus according to (7), in which the correction unit projects a result of estimation of the boundary and two or more endpoints of the boundary to the first information on the basis of the second information to specify one or more of the sides connecting two or more of the vertices corresponding to the two or more endpoints of the plurality of vertices, and corrects a position of the vertex present on the one or more of the specified sides.

(9)

The information processing apparatus according to (8), in which the correction unit projects a center of gravity of one or more surfaces including at least some sides of the one or more of the specified sides to a normal map, on which a distribution of normal vectors of the outer surfaces is mapped, to estimate an ideal normal of the one or more surfaces depending on the normal vector on a point of the normal map on which the center of gravity is projected, and corrects a position of the vertex present on the one or more of the specified sides on the basis of a result of estimation of the normal.

(10)

The information processing apparatus according to (7), in which the correction unit estimates an approximate plane including the boundary on the basis of the second information and projects the approximate plane to the first information, and corrects a position of at least some of vertices among the plurality of vertices on the basis of a result of projection of the approximate plane.

(11)

The information processing apparatus according to (7), in which the correction unit projects a result of estimation of an endpoint of the boundary to the first information on the basis of the second information, and specifies the vertex among the plurality of vertices corresponding to a point on which the endpoint is projected, projects a center of gravity of one or more surfaces including the specified vertex to a normal map, on which a distribution of normal vectors of the outer surfaces is mapped, to estimate an ideal normal of the one or more surfaces depending on the normal vector on a point of the normal map on which the center of gravity is projected, and corrects positions of at least some vertices among the plurality of vertices on the basis of a result of estimation of the normal.

(12)

An information processing method including, by a computer:

acquiring first information associated with a result of estimation of a shape of an object on a real space and second information associated with a result of estimation of a geometrical feature of the object; and correcting the first information on the basis of the second information.

(13)

A program causing a computer to execute:

acquiring first information associated with a result of estimation of a shape of an object on a real space and second information associated with a result of estimation of a geometrical feature of the object; and correcting the first information on the basis of the second information.

REFERENCE SIGNS LIST

1 Information processing system
100 Information processing apparatus
101 Depth estimation unit
103 Attitude estimation unit
105 Dimension space model integration unit
107 Storage unit
109 Normal estimation unit
111 Geometrical feature extraction unit
113 Correction unit
200 Capture position
200 Reference character
210 Depth sensor
210$a$, 210$b$ Imaging unit
230 Polarization sensor

The invention claimed is:

1. An information processing apparatus, comprising:
circuitry configured to:
acquire first information and second information, wherein
the first information is associated with a result of estimation of a shape of an object on a real space,
the second information includes a result of estimation of a boundary of adjacent outer surfaces of a plurality of outer surfaces of the object,
the boundary is estimated based on a normal map, and
the normal map corresponds to a distribution of normal vectors of the plurality of outer surfaces;
project a plurality of endpoints of the boundary to specify a set of sides of a plurality of sides of the object, wherein
the set of sides of the plurality of sides of the object connects a set of vertices of a plurality of vertices of the object,
the set of vertices corresponds to the plurality of endpoints of the boundary, and
the plurality of endpoints of the boundary is projected based on the second information;
project a center of gravity, of at least one outer surface of the plurality of outer surfaces of the object, on the normal map,
wherein the at least one outer surface includes at least one side of the specified set of sides of the object;
estimate a normal vector of the at least one outer surface of the plurality of outer surfaces based on a projection point, of the projected center of gravity, on the normal map; and
correct a position of a vertex, on the specified set of sides of the object, based on a result of estimation of the normal vector of the at least one outer surface.

2. The information processing apparatus according to claim 1, wherein the circuitry is further configured to:
detect a polarization direction of each of a plurality of polarizations, wherein the polarization direction of each the plurality of polarizations is different; and generate the normal map based on a polarization image of the object, wherein the polarization image of the object is associated with a result of the detection of the polarization direction of each of the plurality of polarizations.

3. The information processing apparatus according to claim 1, wherein the first information includes information associated with a result of estimation of a set of outer surfaces of the plurality of outer surfaces.

4. The information processing apparatus according to claim 3, wherein
the first information further includes mesh data that indicates the plurality of sides and the at least one outer surface of the plurality of outer surfaces,
the at least one outer surface is associated with the plurality of vertices, and
the plurality of sides connects the plurality of vertices.

5. The information processing apparatus according to claim 4, wherein the circuitry is further configured to:
correct positions of the set of vertices of the plurality of vertices, and
correct the first information based on the second information and the correction of the positions of the set of vertices.

6. The information processing apparatus according to claim 5, wherein the circuitry is further configured to:
estimate an approximate plane based on the second information;
project the approximate plane on the first information; and
correct the positions of the set of vertices of the plurality of vertices based on a result of the projection of the approximate plane.

7. An information processing method, comprising:
acquiring first information and second information, wherein
the first information is associated with a result of estimation of a shape of an object on a real space,
the second information includes a result of estimation of a boundary of adjacent outer surfaces of a plurality of outer surfaces of the object,
the boundary is estimated based on a normal map, and
the normal map corresponds to a distribution of normal vectors of the plurality of outer surfaces; and
projecting a plurality of endpoints of the boundary to specify a set of sides of a plurality of sides of the object, wherein
the set of sides of the plurality of sides of the object connects a set of vertices of a plurality of vertices of the object,
the set of vertices corresponds to the plurality of endpoints of the boundary, and
the plurality of endpoints of the boundary is projected based on the second information;
projecting a center of gravity, of at least one outer surface of the plurality of outer surfaces of the object, on the normal map,
wherein the at least one outer surface includes at least one side of the specified set of sides of the object;
estimating a normal vector of the at least one outer surface of the plurality of outer surfaces based on a projection point, of the projected center of gravity, on the normal map; and
correcting a position of a vertex, on the specified set of sides of the object, based on a result of estimation of the normal vector of the at least one outer surface.

8. A non-transitory computer-readable medium having stored thereon computer-executable instructions which, when executed by a computer, cause the computer to execute operations, the operations comprising:
acquiring first information and second information, wherein
the first information is associated with a result of estimation of a shape of an object on a real space, and
second information includes a result of estimation of a boundary of adjacent outer surfaces of a plurality of outer surfaces of the object,
the boundary is estimated based on a normal map, and
the normal map corresponds to a distribution of normal vectors of the plurality of outer surfaces;
projecting a plurality of endpoints of the boundary to specify a set of sides of a plurality of sides of the object, wherein
the set of sides of the plurality of sides of the object connects a set of vertices of a plurality of vertices of the object,
the set of vertices corresponds to the plurality of endpoints of the boundary, and
the plurality of endpoints of the boundary is projected based on the second information;
projecting a center of gravity, of at least one outer surface of the plurality of outer surfaces of the object, on the normal map,
wherein the at least one outer surface includes at least one side of the specified set of sides of the object;
estimating a normal vector of the at least one outer surface of the plurality of outer surfaces based on a projection point, of the projected center of gravity, on the normal map; and
correcting a position of a vertex, on the specified set of sides of the object, based on a result of estimation of the normal vector of the at least one outer surface.

9. An information processing apparatus, comprising:
circuitry configured to:
acquire first information and second information, wherein
the first information is associated with a result of estimation of a shape of an object on a real space,
the second information includes a result of estimation of a boundary of adjacent outer surfaces of a plurality of outer surfaces of the object,
the boundary is estimated based on a normal map, and
the normal map corresponds to a distribution of normal vectors of the plurality of outer surfaces;
project a result of estimation of an endpoint of the boundary on the first information based on the second information;
specify a vertex of a plurality of vertices, wherein the vertex corresponds to a projection point of the result of estimation of the endpoint;
project a center of gravity of at least one outer surface of the plurality of outer surfaces to the normal map, wherein the at least one outer surface includes the specified vertex;
estimate a normal vector of the at least one outer surface of the plurality of outer surfaces based on a projection point of the center of gravity on the normal map;

correct positions of a set of vertices of the plurality of vertices based on a result of the estimation of the normal vector; and correct the first information based on the second information and the corrected positions of the set of vertices.

\* \* \* \* \*